(12) United States Patent
Stanikowski et al.

(10) Patent No.: US 9,862,549 B2
(45) Date of Patent: Jan. 9, 2018

(54) TRANSFER METHOD AND TRANSFERRING APPARATUS FOR TRANSFERRING ROD-SHAPED ARTICLE

(71) Applicant: International Tobacco Machinery Poland Sp. z o. o., Radom (PL)

(72) Inventors: Robert Stanikowski, Radom (PL); Radoslaw Owczarek, Radom (PL); Robert Pozorski, Radom (PL); Robert Zadęcki, Radom (PL)

(73) Assignee: International Tobacco Machinery Poland Sp. z o.o., Radom (PL)

( * ) Notice: Subject to any disclaimer, the term of this patent is extended or adjusted under 35 U.S.C. 154(b) by 0 days.

(21) Appl. No.: 15/331,131

(22) Filed: Oct. 21, 2016

(65) Prior Publication Data

US 2017/0113879 A1    Apr. 27, 2017

(30) Foreign Application Priority Data

Oct. 21, 2015  (EP) .................................... 15190813

(51) Int. Cl.
*B65G 47/26*    (2006.01)
*B65G 37/00*    (2006.01)
(Continued)

(52) U.S. Cl.
CPC .............. *B65G 37/00* (2013.01); *A24C 5/322* (2013.01); *B65G 19/02* (2013.01); *B65G 47/31* (2013.01); *B65G 51/03* (2013.01)

(58) Field of Classification Search
CPC ........ B65G 47/30; B65G 47/31; B65G 47/32; B65H 2513/108; A24D 3/0241
(Continued)

(56) References Cited

U.S. PATENT DOCUMENTS 2,580,469 A * 1/1952 Schwartz ............... B65G 47/52
                                                   118/701
3,185,284 A * 5/1965 Molins ................... A24C 5/354
                                                   198/471.1
(Continued)

FOREIGN PATENT DOCUMENTS

CH          501372 A     1/1971
DE          878915 C     6/1953
(Continued)

OTHER PUBLICATIONS

Extended European search report in application 15190813.4, dated May 10, 2016.

*Primary Examiner* — James R Bidwell
(74) *Attorney, Agent, or Firm* — Oppedahl Patent Law Firm LLC

(57) ABSTRACT

The object of the application is a transferring method and apparatus for transferring of a rod-like article from a delivery apparatus to a receiving apparatus, whereas the article is transferred lengthwise between the delivery apparatus and the receiving apparatus, comprising an inlet unit for the lengthwise transfer of the rod-like article and for giving an inlet speed to the rod-like article, an outlet unit for the lengthwise transfer of the rod-like article and for giving an outlet speed to the rod-like article, a transferring channel through which a rod-like article is transferred between the inlet unit and the outlet unit characterized in that between the inlet unit and the outlet unit is situated a transferring unit designed to give a transferring speed to the rod-like article and to transfer the rod-like article along the transferring channel to the outlet unit.

13 Claims, 5 Drawing Sheets

(51) Int. Cl.
  *B65G 19/02* (2006.01)
  *B65G 47/31* (2006.01)
  *B65G 51/03* (2006.01)
  *A24C 5/32* (2006.01)

(58) Field of Classification Search
  USPC .......................................... 198/459.1, 459.8
  See application file for complete search history.

(56) References Cited

U.S. PATENT DOCUMENTS

| | | | |
|---|---|---|---|
| 4,036,118 A | 7/1977 | Penzias | |
| 4,189,045 A | 2/1980 | Verjux | |
| 4,261,236 A | 4/1981 | Verjux | |
| 7,743,908 B2 * | 6/2010 | Haul | A24C 5/323 |
| | | | 198/459.1 |
| 8,002,105 B2 * | 8/2011 | Duchemin | B65G 47/29 |
| | | | 198/419.2 |
| 8,662,088 B2 | 3/2014 | Owczarek | |
| 8,869,969 B2 | 10/2014 | Cie likowski et al. | |
| 8,925,708 B2 | 1/2015 | Cie likowski et al. | |
| 8,967,370 B2 | 3/2015 | Cieslikowski | |
| 9,004,261 B2 | 4/2015 | Cie likowski et al. | |
| 9,061,835 B2 | 6/2015 | Gielniewski | |
| 9,161,571 B2 | 10/2015 | Sikora | |
| 2008/0071417 A1 | 3/2008 | Rice | |
| 2013/0087056 A1 | 4/2013 | Chojnacki | |
| 2014/0011652 A1 | 1/2014 | Cieslikowski et al. | |
| 2014/0097107 A1 | 4/2014 | Zagajska | |
| 2014/0123826 A1 | 5/2014 | Cieslikowski et al. | |
| 2014/0158252 A1 | 6/2014 | Owczarek | |
| 2014/0235416 A1 | 8/2014 | Lisowski et al. | |
| 2015/0013519 A1 | 1/2015 | Cieslikowski et al. | |
| 2015/0047137 A1 | 2/2015 | Gielniewski | |
| 2015/0068376 A1 | 3/2015 | Boleslawski | |
| 2015/0114543 A1 | 4/2015 | Riedel | |
| 2015/0114988 A1 | 4/2015 | Riedel | |
| 2015/0181926 A1 | 7/2015 | Slowik | |
| 2015/0342247 A1 | 12/2015 | Ugrewicz | |
| 2016/0000142 A1 | 1/2016 | Stanikowski et al. | |

FOREIGN PATENT DOCUMENTS

| | | |
|---|---|---|
| DE | 2610820 A1 | 9/1976 |
| DE | 3423570 A1 | 1/1985 |
| DE | 3603895 C1 | 6/1987 |
| EP | 1913824 A1 | 4/2008 |
| EP | 1935260 A1 | 6/2008 |
| EP | 2005848 B1 | 10/2010 |
| FR | 2371360 A1 | 6/1978 |
| WO | 2013004258 A1 | 1/2013 |
| WO | 2014009482 A1 | 1/2014 |

* cited by examiner

TRANSFER METHOD AND TRANSFERRING APPARATUS FOR TRANSFERRING ROD-SHAPED ARTICLE

CROSS-REFERENCE APPLICATIONS

This application claims priority from European application EP15190813.4 filed Oct. 21, 2015, which is hereby incorporated by reference in its entirety for all purposes.

BACKGROUND

The object of the invention is a transferring method and a transferring apparatus for the transferring of tobacco industry's rod-like article.

Rod-like articles manufactured in the tobacco industry such as filter and tobacco rods are moved, after being manufacturing, to successive production machines. In the tobacco industry, the rods are usually transferred longitudinally (axially)/lengthwise to their axis or transversely to their axis, whereas the direction of transfer must be changed between successive stages of the production process due to the arrangement of production machines and rod conveyors.

In the tobacco industry, filter rods and tobacco rods are usually manufactured by cutting a continuous filter or tobacco rod, which takes place on the filter rod manufacturing machines or on cigarette machines. Straight after being manufactured, filter or tobacco rods are separated from the remaining portion of the continuous rod or from other cut-off rods in order to feed individual rods lengthwise to rod receiving apparatus. It is also possible to cut a long individual rod into shorter rods with a defined length. According to the solution known from the DE3423570A1 document, a rod is separated from other rods and transferred to the groove of the drum of the receiving apparatus, whereas the separation takes place by means of discs provided, on the circumference, with grooves having openings through which the vacuum is supplied. According to the solution known from the WO2013004258A1 document, a rod is separated from other rods by means of a strip which transfers the rod lengthwise to the apparatus receiving the rods and transferring them to the next production machine.

Filter rods may be transferred over long distances through tubular channels from rod manufacturing machines to other production machines. In such case the rod, having been transported, is braked at the receiving station, and then accelerated in order to deliver an individual rod to a receiving apparatus, e.g. such apparatus which forms the mass flow of the rods. Such solution is known from the EP2005848B1 patent.

The devices from prior art presented above are provided with an inlet unit and an outlet unit, whereas the outlet unit does not guarantee a full synchronisation of rod transferring to the rod receiving apparatus because the time of transfer of the rod between the inlet unit and the outlet unit is not precisely defined. Deviations of the moment of rod delivery to the rod receiving device are possible. If the receiving device delivers the rods to machines on which successive production processes are carried out, there is a need to receive and deliver the rods further at defined moments of time due to the necessity of a precise synchronisation of the movement of the rod-like article with the movement of receiving grooves of the receiving apparatus.

BRIEF SUMMARY

The objective of this invention is to develop an apparatus which would overcome the problems known from the prior art and guarantee the synchronisation with any rod receiving apparatus.

The essence of the invention is a method of transferring of a tobacco industry's rod-like article between a delivery apparatus and a receiving apparatus, whereas the article is moved lengthwise between the machines, wherein the rod-like article delivered from the delivery apparatus is given an inlet speed by an inlet unit and inserted into a transferring channel, the rod-like article is given a transferring speed by a transferring unit, the rod-like article is transferred by means of a transferring unit to an outlet unit, the rod-like article is given an outlet speed by the outlet unit and the rod-like article is delivered to the receiving apparatus, wherein during the transfer of the rod-like article in the transferring channel the speed of the rod-like article is reduced relative to the inlet speed.

The method according to the invention is characterised in that the speed of the rod-like article is reduced to zero.

The method according to the invention is characterised in that during the transfer of the rod-like article in the transferring channel after the reduction of speed, the speed of the rod-like article is increased by means of a transferring unit.

The method according to the invention is characterised in that the speed of the rod-like article is increased to the inlet speed or a higher speed.

The method according to the invention is characterised in that the transferring and/or outlet speed is given to the rod-like article by means of the transferring unit and/or the outlet unit in synchronisation with the position of the movable receiving apparatus.

The substance of the invention is also a transferring apparatus for the transferring of tobacco industry's rod-like article from the delivery apparatus to the receiving apparatus, whereas the article is transferred lengthwise between the delivery apparatus and the receiving apparatus, comprising an inlet unit for the lengthwise transfer of the rod-like article and for giving an inlet speed to the rod-like article, an outlet unit for the lengthwise transfer of the rod-like article and for giving an outlet speed to the rod-like article, a transferring channel through which the rod-like article is transferred between the inlet unit and the outlet unit. The apparatus according to the invention is characterised in that between the inlet unit and the outlet unit a transferring unit is situated, wherein the transfer unit is designed to give a transferring speed to the rod-like article and for the transferring of the rod-like article along the transferring channel to the outlet unit, wherein the transforming unit is provided with speed reducing means adapted to reduce the speed of rod-like article relative to the inlet speed.

The apparatus according to the invention is characterised in that the speed reducing means includes abutting elements.

The apparatus according to the invention is characterised in that the speed reducing means includes vacuum openings in the transferring channel.

The apparatus according to the invention is characterised in that the receiving apparatus is a moveable receiving apparatus, and the transferring apparatus is designed to give a transferring and/or outlet speed to the rod-like article by means of the transferring unit and/or the outlet unit synchronously with the position of the moveable receiving apparatus.

Due to the use of the apparatus according to the invention it is possible to handle the transferred rods with great care. The apparatus according to the invention makes the correct insertion of the rods into the receiving apparatus completely independent of the speed and the frequency at which the rods are delivered by the delivery apparatus.

BRIEF DESCRIPTION OF DRAWINGS

The object of the invention was presented in detail in a preferred embodiment in a drawing in which.

DETAILED DESCRIPTION

Figure 1:
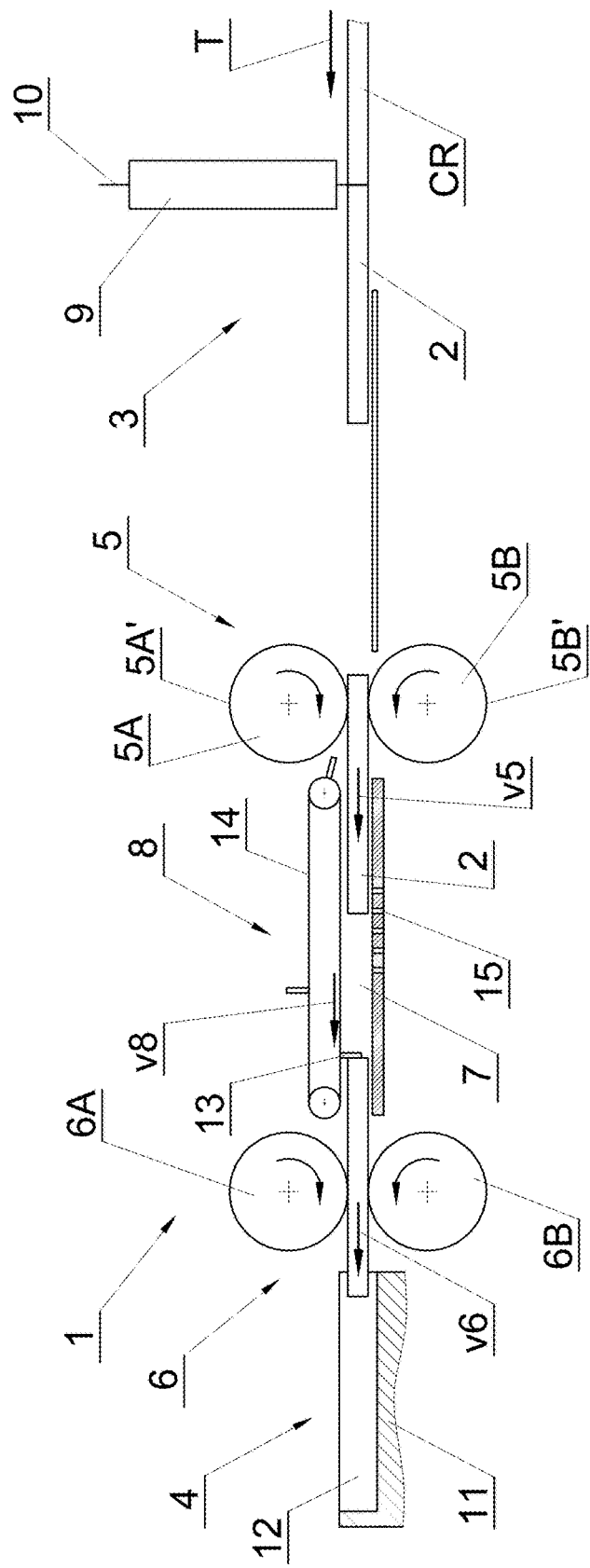
FIG. 1—shows a transferring apparatus in the first embodiment in a front view.

The transferring apparatus 1, shown in FIG. 1, for the transferring of rod-like articles 2 is situated between a delivery apparatus 3 and a receiving apparatus 4. In the embodiment shown, the delivery apparatus is a machine for the manufacture of rod-like articles 2 in the form of filter rods, whereas in FIG. 1 only a fragment of this machine comprising a rotary cutting head 9 provided with knives 10 is shown. The cutting head cuts off filter rods 2 from a continuous rod CR moving in the direction T. The receiving apparatus 4 is a drum conveyor 11 having, on its circumference, a plurality of grooves 12 situated parallel to the axis of rotation of the drum conveyor parallel to the plane of the drawing. The drum conveyor 11 has a task to deliver the received rods 2 to a machine on which next production stages are carried out. The transferring apparatus 1 is provided with an inlet unit 5 and an outlet unit 6 for the lengthwise transfer of the rod 2 and for giving an inlet speed v5 and an outlet speed v6, respectively, to the rod 2. Between the inlet unit 5 and the outlet unit 6 is situated a transferring channel 7 along which spreads a transferring unit 8 whose task is to change the speed of the rod 2 and give the transferring speed to the rod 2. The transferring unit is designed in the form of a strip 14 with lugs 13.

Figure 2:
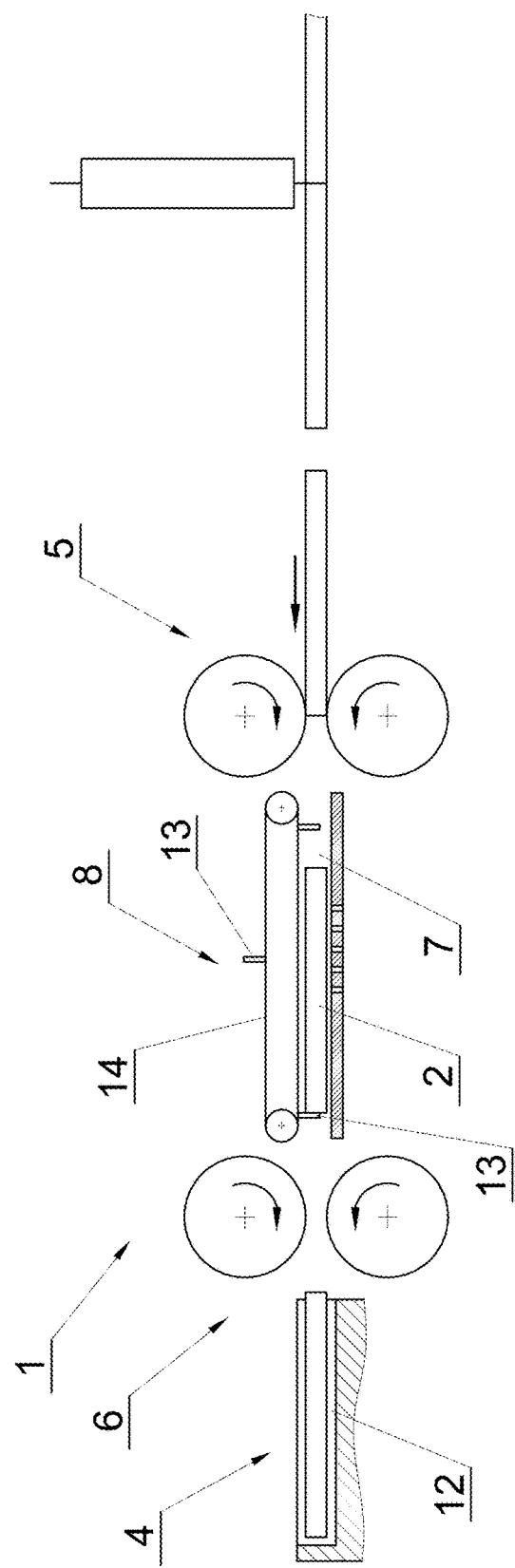
FIG. 2—shows the transferring apparatus in the first embodiment in a front view in a different movement phase, FIG. 3—shows the transferring apparatus in the first embodiment in a top view, FIG. 4—shows the transferring apparatus in the second embodiment in a front view, FIG. 5—shows the transferring apparatus in the second embodiment in a top view.
Figure 3:
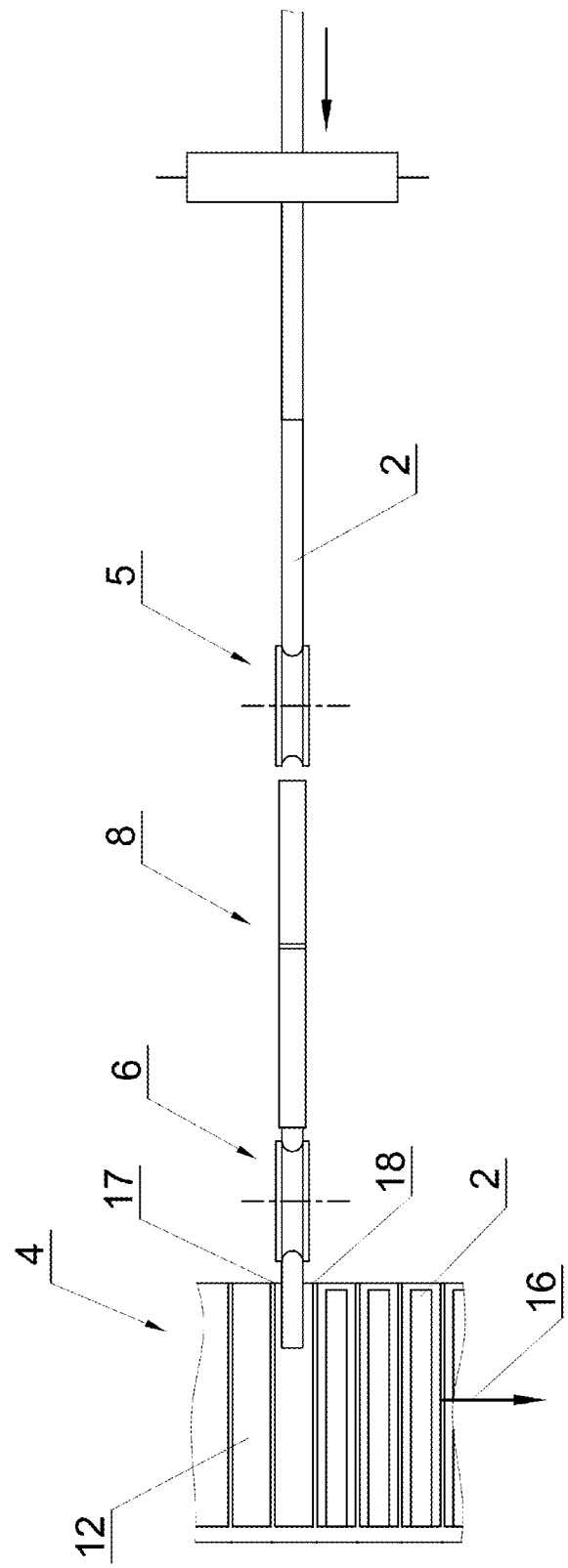

As shown in FIG. 1, the rod 2 which has been delivered from the delivery apparatus 3 is inserted by the inlet unit 5 with the speed v5 into the transferring channel 7, such speed being given by friction by the rollers 5A and 5B, whereas the speed v5 is a circumferential speed of the circumferential surfaces 5A' and 5B' of the rollers 5A and 5B. The rod 2 is pushed close to the lug 13 (FIG. 2) which plays the role of an abutting element. The lug 13 reduces the speed of the rod 2, the speed of the rod 2 may be reduced even to zero. The reduction of speed of the rod 2 in the transferring channel 7 may be supported by the vacuum supplied to the openings 15 made in the wall of the transferring channel 7, for example along the channel 7. Then the rod 2 is transferred with the speed v8 in the direction of the outlet unit 6, i.e. is pushed along the transferring channel 7 by the lug 13 of the transferring unit 8 (FIG. 1). The rod 2, after coming into contact with the rollers 6A and 6B of the outlet unit 6, is further conveyed with the speed v6 and is delivered to the receiving unit 4, more precisely, to the groove 12 of the drum conveyor 11 as shown in FIG. 2. Due to the synchronisation of movement of the transferring unit 8 with the movement of the drum conveyor 11 it is possible to precisely place the rod 2 in the groove 12, i.e. the end piece of the rod 2 slips into the groove 12 without hitting the edges 17, 18 of the groove with its lateral surface. After slipping the rod 2 into the groove 12, the rod 2 is moved in the transverse direction relative to the axis of the rod 2 marked with the arrow 16 as shown in FIG. 3.

Figure 4:
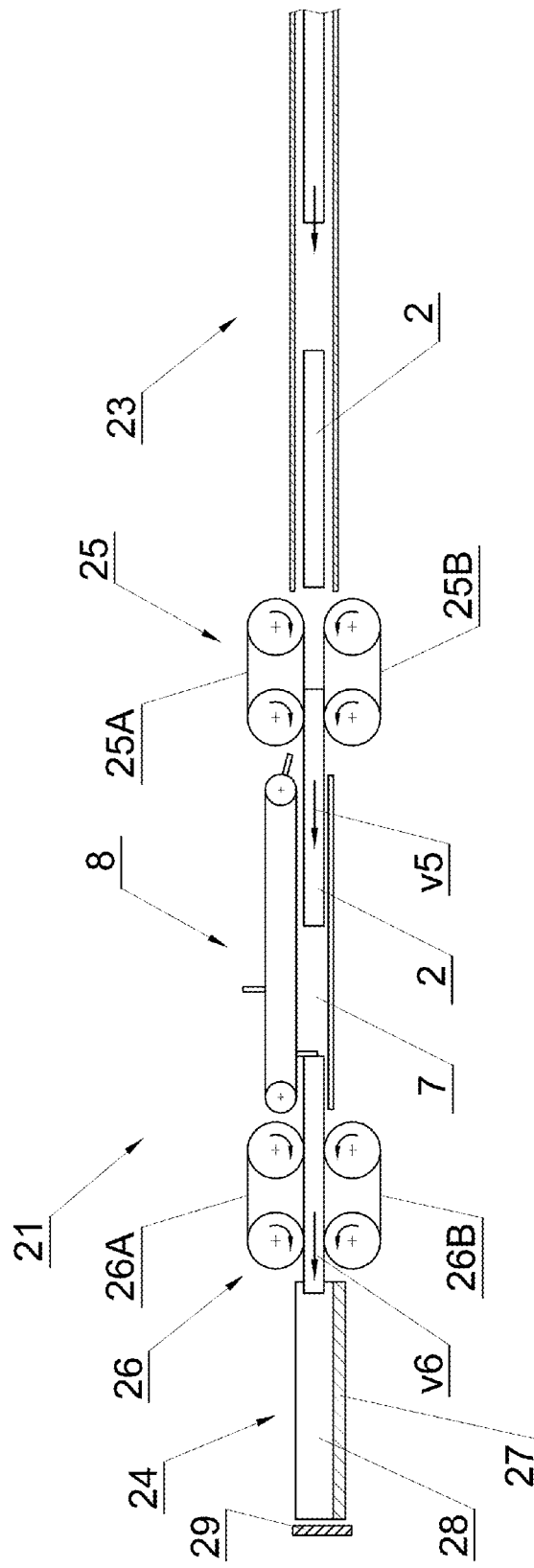
Figure 5:
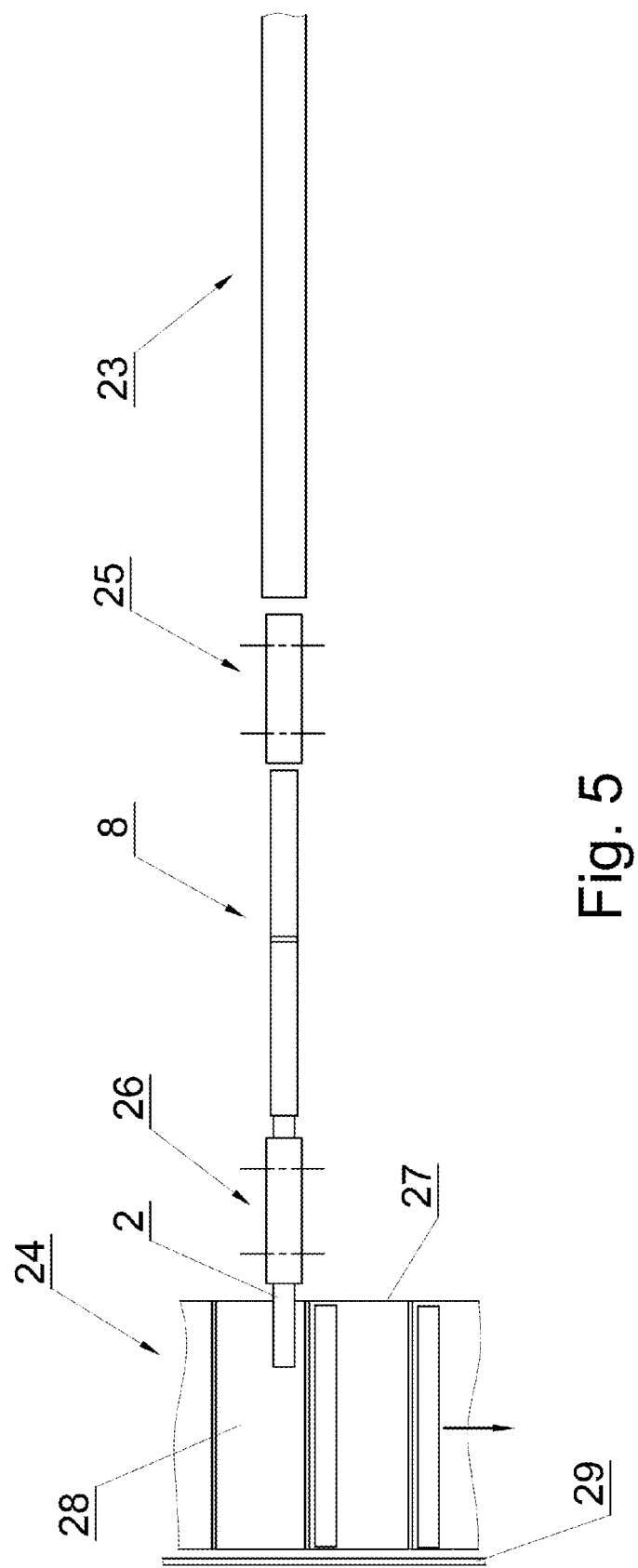

The apparatus in the second embodiment was shown in FIG. 4. The transferring apparatus 21 is provided with the inlet unit 25 having the strips 25A and 25B between which the rods 2 are transported. The strips 25A and 25B, which give the speed v5 to the rods 2, are mounted on the pairs of pulleys coupled with each other so that the strips 25A and 26B move with the same speeds. The outlet unit comprising the strips 26A and 26B has a similar structure. The rods 2 are inserted into the transferring unit from the delivery apparatus 23 in the form of a tubular pneumatic conveyor designed to transfer the filter rods over long distances among the machines. The receiving apparatus 24 designed to receive the rods 2 is the belt conveyor 27 provided with grooves 28. The receiving apparatus 24 was shown in a top view in FIG. 5, whereas the width of the grooves 28 is several times greater than the diameter of the rod 2. An abutting slat 29 which will constitute an abutment for moving rods 2 may be positioned along the belt conveyor 27.

In both embodiments described above, each of the inlet units 5, 25 and outlet units 6, 26 may be designed in any other way so that they comprise elements for the lengthwise transfer of longitudinal rod-like articles. The transferring unit 8 may be designed in the form of a chain conveyor with the lugs 13 fastened on it.

In both embodiments of the transferring unit 1, it is advantageous to control the transferring speeds and/or the outlet speed so that the movement of the rod-like article 2 takes place synchronously with the position of the receiving apparatus, for example with the position of the seat of the drum conveyor. The synchronous control is to be understood as such control which results in the rod-like article 2 being inserted into the seat 12 of the drum conveyor 4. It is particularly significant in a situation where individual rod-like articles appear at different moments of time at the inlet of the transferring apparatus 1,

LIST OF DESIGNATIONS

1—transferring apparatus
2—rod-like article
CR—continuous rod
T—direction of movement of continuous rod
3—delivery apparatus
4—receiving apparatus
5—inlet unit
v5—inlet speed
5A, 5B—inlet roller
6—outlet unit
v6—outlet speed
6A, 6B—outlet roller
7—transferring channel
8—transferring unit
v8—transferring speed
9—cutting head
10—knife of cutting head
11—drum conveyor
12—groove
13—lug
14—strip
15—openings for the supply of vacuum
16—direction of transport
21—transferring apparatus
23—delivery apparatus
24—receiving apparatus
25—inlet unit
25A, 25B—strip
26—outlet unit
26A, 26B—strip
27—conveyor belt
28—groove
29—abutting slat

The invention claimed is:

1. A method for transferring of a rod-like article between a delivery apparatus and a receiving apparatus, whereas the rod-like article is transferred lengthwise between the delivery apparatus and the receiving apparatus wherein
the rod-like article delivered from the delivery apparatus is given an inlet speed by an inlet unit and is inserted into a transferring channel,
the rod-like article is given a transferring speed by a transferring unit adapted to reduce and to increase the transferring speed,
the rod-like article is transferred by means of the transferring unit to the outlet unit,
the rod-like article is given an outlet speed by the outlet unit and the rod-like article is delivered to the receiving apparatus wherein during the transfer of the rod-like article in the transferring channel the speed of the rod-like article is reduced relative to the inlet speed, and during the transfer of the rod-like article in the transferring channel, after the reduction of speed, the speed of the rod-like article is increased by the transferring unit.

2. The method as in claim 1 characterised in that the speed of the rod-like article is reduced to zero.

3. The method as in claim 1 characterised in that the speed of the rod-like article is increased to the outlet speed or a greater speed.

4. The method as in claim 1 characterised in that the transferring and/or outlet speed of the rod-like article is given by means of the transferring unit and/or the outlet unit in synchronisation with the position of the receiving apparatus.

5. The method as in claim 2 characterised in that the transferring and/or outlet speed of the rod-like article is given by means of the transferring unit and/or the outlet unit in synchronisation with the position of the receiving apparatus.

6. The method as in claim 1 characterised in that the transferring and/or outlet speed of the rod-like article is given by means of the transferring unit and/or the outlet unit in synchronisation with the position of the receiving apparatus.

7. The method as in claim 3 characterised in that the transferring and/or outlet speed of the rod-like article is given by means of the transferring unit and/or the outlet unit in synchronisation with the position of the receiving apparatus.

8. A transferring apparatus for the transferring of a rod-like article from a delivery apparatus to a receiving apparatus, whereas the rod-like article is transferred lengthwise between the delivery apparatus and the receiving apparatus, comprising an inlet unit for the lengthwise transfer of the rod-like article and for giving an inlet speed to the rod-like article, an outlet unit for the lengthwise transfer of the rod-like article and for giving an outlet speed to the rod-like article, a transferring channel through which the rod-like article is transferred between the inlet unit and the outlet unit characterised in that between the inlet unit and the outlet unit a transferring unit is situated, wherein the transfer unit is designed to give a transferring speed to the rod-like article and to transfer the rod-like article along the transferring channel to the outlet unit wherein the transferring unit is provided with speed reducing means adapted to reduce the speed of rod-like article relative to the inlet speed, and the transferring unit is adapted to increase the speed of the rod-like article during the transfer of the rod-like article in the transferring channel, after the reduction of speed.

9. The transferring apparatus as in claim 8 characterised in that the speed reducing means includes abutting elements.

10. The transferring apparatus as in claim 8 characterised in that the speed reducing means includes vacuum openings in the transferring channel.

11. The transferring apparatus as in claim 8 characterised in that the receiving apparatus is a moveable receiving apparatus, and the transferring apparatus is designed to give a transferring and/or outlet speed to the rod-like article by means of the transferring unit and/or the outlet unit synchronously with the position of the moveable receiving apparatus.

12. The transferring apparatus as in claim 9 characterised in that the receiving apparatus is a moveable receiving apparatus, and the transferring apparatus is designed to give a transferring and/or outlet speed to the rod-like article by means of the transferring unit and/or the outlet unit synchronously with the position of the moveable receiving apparatus.

13. The transferring apparatus as in claim 10 characterised in that the receiving apparatus is a moveable receiving apparatus, and the transferring apparatus is designed to give a transferring and/or outlet speed to the rod-like article by means of the transferring unit and/or the outlet unit synchronously with the position of the moveable receiving apparatus.

* * * * *